United States Patent
Natarajan

(10) Patent No.: US 6,611,599 B2
(45) Date of Patent: *Aug. 26, 2003

(54) WATERMARKING OF DIGITAL OBJECT

(75) Inventor: Balas K. Natarajan, Los Gatos, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,215

(22) Filed: Sep. 29, 1997

(65) Prior Publication Data

US 2002/0016916 A1 Feb. 7, 2002

(51) Int. Cl.⁷ ............................. H04N 7/167; H04L 9/30
(52) U.S. Cl. ......................... 380/203; 380/54; 380/55; 713/176
(58) Field of Search ................................. 382/232, 100; 380/5, 201, 203, 54, 55; 713/176

(56) References Cited

U.S. PATENT DOCUMENTS

| | | | |
|---|---|---|---|
| 4,405,829 A | | 9/1983 | Rivest et al. ............... 178/22.1 |
| 4,939,515 A | | 7/1990 | Adelson ........................ 341/51 |
| 5,499,294 A | | 3/1996 | Friedman ..................... 380/10 |
| 5,530,751 A | | 6/1996 | Morris ........................... 380/4 |
| 5,530,759 A | | 6/1996 | Braudaway et al. ........... 380/54 |
| 5,568,570 A | | 10/1996 | Rabbani ..................... 382/238 |
| 5,606,609 A | * | 2/1997 | Houser et al. ............... 713/179 |
| 5,613,004 A | * | 3/1997 | Cooperman et al. .......... 380/28 |
| 5,664,018 A | * | 9/1997 | Leighton ..................... 380/54 |
| 5,765,176 A | * | 6/1998 | Bloomberg ................. 707/514 |
| 5,778,070 A | * | 7/1998 | Mattison ..................... 380/25 |
| 5,809,139 A | * | 9/1998 | Girod et al. ................... 380/5 |
| 5,825,892 A | * | 10/1998 | Braudaway et al. .......... 380/51 |
| 5,848,155 A | * | 12/1998 | Cox .............................. 380/4 |
| 5,949,885 A | * | 9/1999 | Leighton ..................... 380/54 |

FOREIGN PATENT DOCUMENTS

| | | | |
|---|---|---|---|
| EP | 0651554 A1 | 5/1995 | ............ H04N/1/21 |
| EP | 0766468 A2 | 4/1997 | ............ H04N/7/08 |
| WO | WO89/08915 | 9/1989 | .......... G11B/20/10 |
| WO | WO97/13248 | 4/1997 | .......... G11B/20/00 |

OTHER PUBLICATIONS

Craver et al, "Can Invisible Watermarks Resolve Rightful Ownerships?" pp. 1–21, IBM Research Report (RC 20509—Computer Science/Mathematics), Jul. 1996.*

Natarajan, "Robust Public Key Watermarking of Digital Images," Sep. 24, 1997.*

(List continued on next page.)

*Primary Examiner*—Gilberto Barron
*Assistant Examiner*—Paul E. Callahan

(57) ABSTRACT

A technique for identifying digital object using a digital watermark. The technique includes the steps of encrypting a message derived from source data on the digital object, to obtain an encrypted message digest (S); deriving a watermark from the encrypted message digest (S); and incorporating the watermark into the source data. The encryption is preferably done with a public key encryption system. The message to be encrypted can be obtained via performing a hash function on the source data on the digital object to obtain a message digest (M). The message digest (M) is the message encrypted with the signature encryption key to obtain the encrypted message digest (S). The watermark is resistant to cropping, scaling, and truncation.

14 Claims, 10 Drawing Sheets

OTHER PUBLICATIONS

Cox et al, "A Secure, Imperceptable yet Perceptually Salient, Spread Spectrum Watermark for Multimedia," Southcon/96. Conference Record, pp.: 192–197, Jun. 1996.*

Nikolaidis et al, "Copyright Protection of Images Using Robust Digital Signatures," IEEE Acoustics, Speech, and Signal Processing ICASSP–96, vol. 4, pp. 2168–2171, 1996.*

Bruce Schneier, "Applied Cryptography, Protocols, Algorithms, and Source Code in C", (Book), pp. 280–289, 321–323, 328–333, Publisher John Wiley & Sons, Inc.

Cox et al. "Secure Spread Spectrum Watermarking for Multimedia", pp. 1–33, Copyright, NEC Research Institute, Tech Report 95–10.

Ingemar J. Coxt, Joe Kilian, Tom Leighton and Talal Shamoon, "Secure Spread Spectrum Watermarking for Multimedia", NEC Research Institute, Technical Report 95–10.

Schneider M., et al., "Robust Content Based Digital Signature for Image Authentication", Proceedings of the 1996 IEEE International Conference in Image Processing, vol. 3, Sep. 1996, pp. 227–230.

Delaigle J.–F, et al., "Digital Watermarking", Proceedings of the SPIE, vol. 2659, Feb. 1996, pp. 99–110.

* cited by examiner

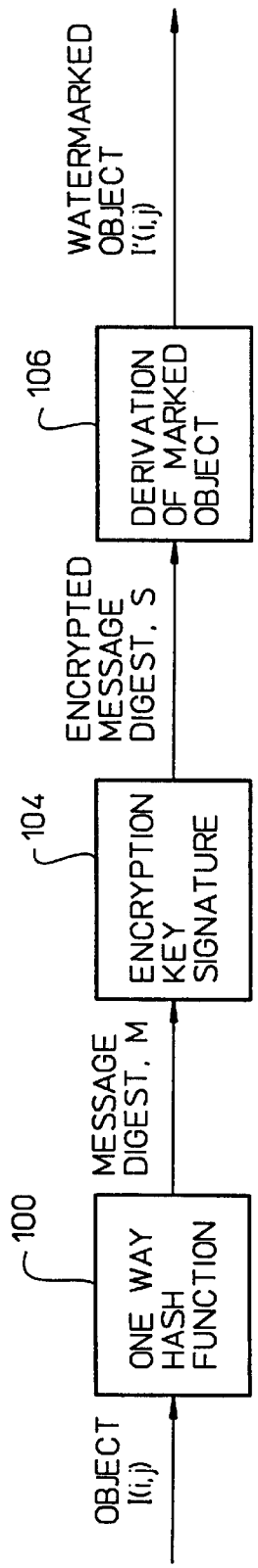
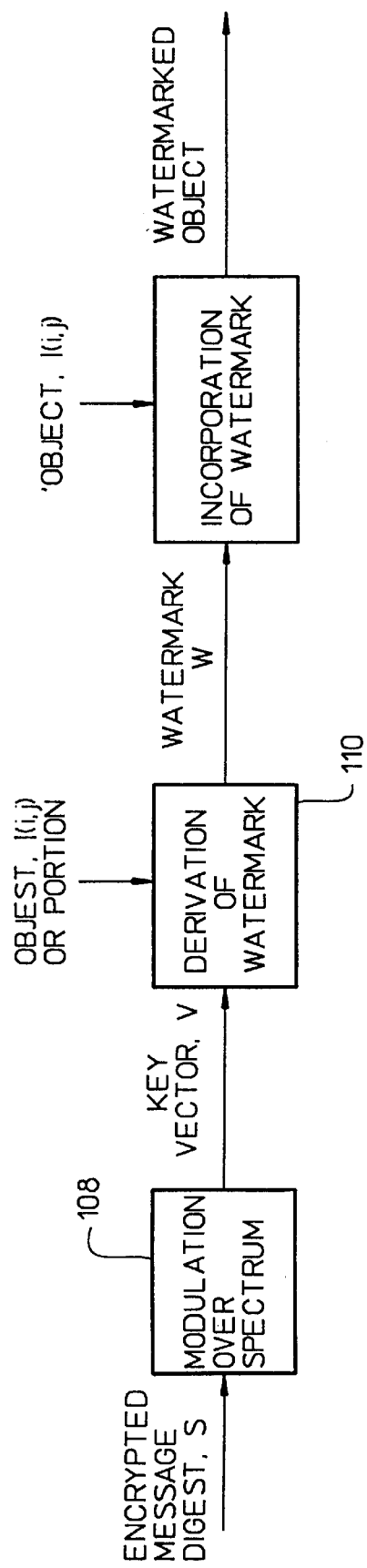

WATERMARKING OF DIGITAL OBJECT

FIELD OF THE INVENTION

The present invention is related to techniques for watermarking digital data, and more specifically, to watermarking digital data such as images and audio data for authenticating copyright ownership.

BACKGROUND

Because of the rapid increase of electronic commerce in the recent years, secured data transaction is becoming more and more important. To prevent electronic data to be appropriated by unauthorized parties, cryptographic methods have been used to transmit digital data between consenting parties to guard against unintended exposure to other parties. Various kinds of data, including military information, financial transaction, personal data, and the like can be transmitted via cryptography to protect the data.

In the arena of protecting the right to original art or literary works, in the past, most violations were by unauthorized parties making physical copies of authorized copies of the original (e.g., copyrighted) works. Copies of physical artistic material, such as copyrighted paintings, photographs, phonographs, and analog audio tapes, are usually perceptibly inferior to the originals. The degradation of fidelity in the copying process, e.g., in photocopying or photography, is a factor in deterring unauthorized copying of such material. Today, many visual, audio, literary, or other proprietary works are stored and transmitted digitally. Such digital material can be copied over and over without significant loss in fidelity. The risk to the owner of an original artistic work, or proprietary work, is that once the digital data are transmitted, if data suspected to be copies of the transmitted data are found, the verification of whether the suspect data are copied from the originally transmitted data, for example, digital data of a piece of art work, is usually impossible.

Recently, digital watermarking has been devised as a security technique to facilitate the identification of the source of digital material for the purpose of, for example, copyright enforcement. The watermark is an identification code that is imbedded in the original digital data and is preferably imperceptible to the human observer of the artistic work. One example of a scheme for watermarking involves inserting an identification string into a digital audio signal to substitute the insignificant bits of randomly selected audio samples with the bits of an identification code. Another example of watermarking relating to watermarking video digital works involves assigning a predetermined value to a predetermined coding parameter that, when modified, requires a plurality of further parameters to be modified in order to correctly decode the video signal. In one watermarking technique each copy of an object is marked with an identifier code. More recently, a watermarking scheme in which a two-dimensional spread spectrum signal is added to an image has been proposed. To verify the watermark in a given image, the original image is subtracted from the given image and the correlation of the difference image to the watermark signal is computed.

Although much advance has been made in watermarking digital data, generally, prior techniques of watermarking suffer from a variety of shortcomings. Often, the original image is necessary to verify the presence of the watermark. Manipulative operations such as cropping to cut out a portion of the work and scaling to obtain a work of larger or smaller size pose a considerable problem on the verification process. Many times the watermarking scheme is invertible, i.e., an attacker (or temperer), based on a first watermarked image but without knowledge of what the first watermark is, would be able to compute a second image and a second watermark such that inserting the second watermark into the second image would result in the first watermarked image. Such invertible watermarking schemes can make the verification of authentic copies of a copyrighted work difficult. Further, it may even lead to ownership disputes on valuable digital data since an unscrupulous person might appropriate another's watermarked material, subtract from it his own watermark and claim the resulting product to be his own. Often, in prior watermarking techniques, changes in contrast or brightness may fool the verification algorithms, making them less reliable. Furthermore, many of the watermark schemes do not offer a mechanism for creating and managing watermarks. This means that if the same watermark is used to protect several works, compromise in the secrecy of the watermark will compromise the protection for all of the works. What is needed a watermarking technique that can address these deficiencies. The present invention provides a watermarking technique that is resistant to cropping, invertible, resistant to brightness or contrast changes, and will not compromise other related watermarked works if the mechanism of watermarking in one watermarked work is disclosed.

SUMMARY

The present invention provides a technique for identifying digital object using a digital watermark. This technique can be easily implemented using computers. The technique includes encrypting data derived from a set of source data on the digital object, deriving from the encrypted data a watermark, and incorporating the watermark into the source data. Preferably, the source data of the digital object are processed through a hash function to obtain a message digest (M) on the digital object and the message digest (M) is encrypted with a signature encryption key to obtain an encrypted message digest (S). Further, the encryption of the message digest (M) is preferably done with a public key-private key encryption system. Because the preferred mode is to process the source data through a one-way hash function to obtain a message digest, for clarity and convenience, the set of data for encryption derived from the set of source data is termed a "message" or "message digest" herein although they do not necessarily have to have been through a one-way hash function. The set of encrypted data is called "encrypted message digest" herein for the same reason.

The present watermarking technique is versatile and can be advantageously employed to watermark a variety of digital objects, including audio, video, image, multimedia data, and the like. Further, the present technique offers high security because it is not easily foiled by attackers. For example, by a using a hash function in conjunction with encryption in which a private key is kept confidential, the present technique offers the advantage of being not invertible, unlike many prior watermarking techniques. Therefore, it is very difficult for an attacker to backcompute the original watermark by the disclosure of immediate information. To further increase security, in an embodiment of the present invention a public key encryption system is employed. As a result, a suspect object (i.e., an object suspected to be copied from an original, e.g., copyrighted, object) can be checked with the public key of the original object's owner to determine whether the watermark is present without compromising the other watermarked objects. In the embodiment in which an encryption technique involving a public key is used, ownership of an object can be established to a neutral party, such as a court of law, using only the public key of the object's owner, without requiring the owner to reveal his private key. Also, the watermark is not removed by lossy compression (in which less perceptually important information is severed to reduce the size of the data file) or cropping (in which a portion of the object is cut). In the embodiment in which the watermarking vector is orthogonal to the vector of the pixels into which the watermark is to be inserted, changes in the brightness or contrast will not fool the verification algorithm.

BRIEF DESCRIPTION OF THE DRAWINGS

The following figures are included to better illustrate the embodiments of the technique of the present invention. In these figures, like numerals represent like features in the several views.

FIG. 1 is a block diagram showing an embodiment of the watermarking technique of the present invention.

FIG. 2 is a block diagram showing in further detail an embodiment of the watermarking technique of FIG. 1

DETAILED DESCRIPTION

Figure 3:
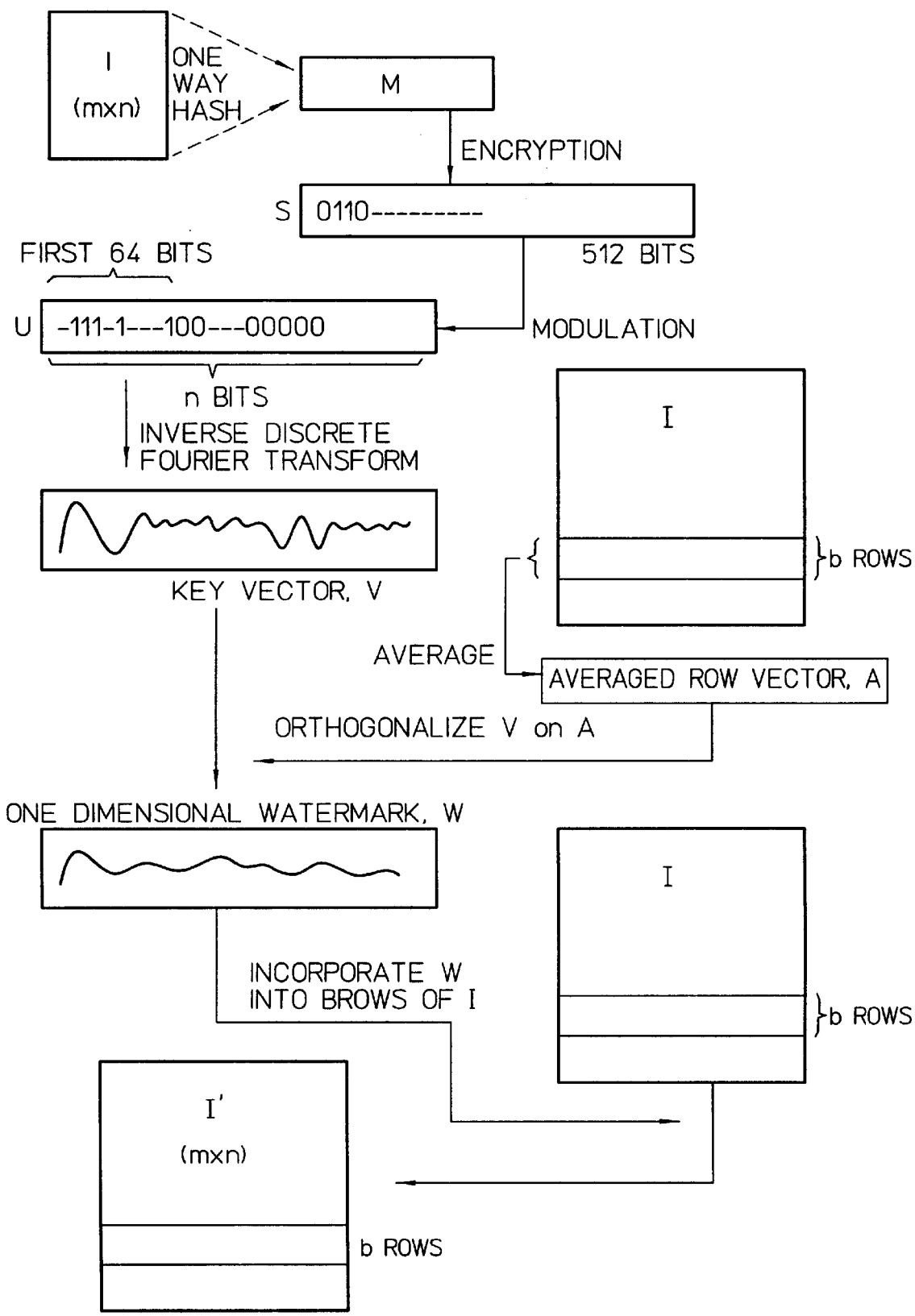
FIG. 3 shows a flow diagram of an embodiment of a watermarked object being obtained from a digital object according to the present invention.

The present invention provides a technique for inserting a digital watermark into a digital object and for evaluating a digital object for the watermark. An encryption technique is used in the derivation of the watermark and the watermark is incorporated into the digital object in such a way to render it extremely hard for an attacker (i.e., one who tampers with the watermarked data to remove or change the watermark) to derive the original digital object from the watermarked digital object. The digital watermark is resistant to cropping, scaling, inadvertent distortions, as well as the intentional removal or corruption of the watermark by an attacker.

A digital object that can be watermarked with the technique of the present invention is referred to as a "physical object" in that it can be an digital visual image; digital audio program, e.g., music; digital tactile data, e.g., data which can be transformed into tactile information that can be sensed by touch; multimedia data; or simply digital data strings that can be divided into discrete segments arrangeable into rows and columns of "pixels." One obvious example of such pixels would be, for an image, the pixels of digital information obtained by scanning a color photograph into digital information representing rows and columns of color dots (commonly known in visual display technology as "pixels"). Thus, a digitized photograph may contain hundreds of rows and columns of pixels. However, in this disclosure, "pixels" can be the discrete segments of digital data for other types of digital information, e.g., those mentioned in the above. In the case of sound recording, for example, a sound signal may be sampled by an A/D converter, which would output samples having values representative of the characteristics of the sound signal at particular time segments. The technique for obtaining pixels of data on visual images, audio signals, and other data streams are well known in the art. Any conventional technique for obtaining the digital objects is applicable. As another example, a digital camera or a computer running a computer graphics software can be used to generate digital images directly. Similarly, music can be converted from sound waves to digital data by using A/D converters. These digital objects, as well as other types of digital objects, are applicable in the present invention.

An embodiment of the watermarking technique of the present invention is depicted in FIG. 1. A digital object, $I(i,j)$, having m rows and n columns of pixels, is processed through a hash function 100 (e.g., a one-way hash function such as the MD5 function) to result in a message digest M. The function of the hash function is to take the input data $I(i,j)$ and convert them into a fixed-size string (hash), and preferably a much shorter string for a large object, much as a fingerprint, of the input data $I(i,j)$. Preferably, the hash is generated in such a way that it is very difficult to generate the original input data from the hash, i.e., the message digest M. This difficulty of back calculation is beneficial because if an attacker were able to derive the input data from the hash, he might be able to remove or change the watermark. Many hash functions are known in the art and can be applied in the present technique. One applicable one-way hash function (or message digest algorithm) known in the art is the MD5 method. Other examples of applicable one-way hash functions include the SNEFRU function, SHA function, and HAVAL function. (See Schneier, B., *Applied Cryptography*, John Wiley and Sons, 1993, pp. 333–346 for a discussion on one-way hash functions.) A person skilled in the art will know how to apply such hash functions to a digital object. In general, in selecting a hash function H(F) that operates on an arbitrary-length message F to obtain a fixed-length hash value, h, $$h=H(M),$$

the following characteristics are desired: Given M, it is easy to compute h; given h, it is hard to compute M; and given M, it is hard to find another message M' with the property H(M)=H(M'). Preferably, the hash function is selected such that it is resistant to brute force attacks, as well as Birthday attacks, which are based on the occurrence of two random messages that return the same value through the same hash function.

The message digest M is then encrypted with a signature. The encryption algorithm can either be a public key-private key system (asymmetric data encryption algorithm) or a private key system (symmetric data encryption algorithm). Such an encryption imparts a unique feature in the message digest M that will distinguish these encrypted data from other data, thus acting much like a physical signature on a physical document. If a private key alone is used for encryption, this private key preserves the secrecy of the original message and the encrypted message digest is not invertible, i.e., an attacker cannot back calculate the message digest M or the original object from the encrypted message digest. However, if it is necessary to prove ownership, e.g., to a third party such as a court of law, to verify the owner's signature, the owner would have to reveal his private key. With the private key revealed, his other watermarked objects that are marked with the same or similar private key watermark might be compromised since an attacker might be able to gain access to his private key to use it to obtain information on the watermarking of the other objects.

A more preferable way would be to use a public key-private key encryption system (referred to as the "public key system" hereinafter unless specified otherwise). In encryption using the public key system, the user possess a matched pair of keys: a private key and a public key. The private key is kept secret and is known only to the user whereas the public key can be distributed widely. A message encrypted with either key can only be decrypted with the other key. If a user encrypts a message with his private key, then the message can only be decrypted with his public key. Because only the user has the private key, the encrypted message can be decrypted only with his public key. Since the private key is known only to the encryptor, it is established that if the encrypted message can be decrypted with the user's public key, he must have encrypted the message, i.e., he has "signed" the message with his "signature." The strength of the signature is dependent on knowing that the public key of the user is genuine. For this reason, public keys are preferably notarized or certified by third parties. In this invention, when the public key system is used, the private key is used to encrypted the message to create the watermark from the original image. When it is necessary to prove ownership of a watermark, the public key can be provided, e.g., to a verifying third party, to verify the owner's signature. The advantage of using public key encryption in this invention is that since the private key is used to produce the watermark from the original object, it will be impossible, or extremely difficult, for an attacker to remove the watermark from the watermarked object to create a false original without the private key, even if he had access to the public key.

In either the private key system case or the public key system case, the private key of the encryption algorithm is necessary to back-calculate from the encrypted M to obtain the original M. Many encryption algorithms are known in the art and can be used for this purpose. A good example is RSA algorithm. Other applicable public key encryption algorithms include ELGAMAL algorithm and DSS (digital signature standard) algorithm. Many other encryption algorithms are also known in the art, e.g., POHLIG-HELLMAN algorithm, RABIN algorithm, and DES (data encryption standard) algorithm, see Schneier, B., *Applied Cryptography,* supra. A person skilled in the art will know how to apply such encryption algorithms to a digital object.

It is noted that the encryption step, either using a public key system or a private key system, can be used to encrypt the digital object directly without processing through a hash function, as long as the private key is kept secret. However, if the digital image is large, extremely long computational time will be needed. The hash function reduces the size of the data that requires encryption to produce the watermark.

After the encrypted message digest S is formed, it is processed (block 106) to derive the watermarked object I'(i,j). In an embodiment, shown in FIG. 2, to derive the watermarked object I'(i,j), the encrypted message digest S is modulated, e.g., to modify the amplitude of the signal, to spread over a perceptually significant region of the spectrum (block 108). By this process (block 108), a key vector V, representing a physical domain signal, is obtained. Spreading the message digest S over a large part of the spectrum has the advantage of rendering the watermark substantially imperceptible to the human sense organ for which the object is designed. Further, the watermark will be preserved if the data is manipulated by processes such as compression or cropping. For example, spreading the message digest S over a substantial part of the spectrum would not overly distort a certain small range of colors in a visual image or distort a certain small range of audio frequency. Since a useful watermark preferably is preserved when undergoing lossy compression or cropping, the watermark is placed in the portion of the spectrum in the perceptually significant portion of the spectral frequencies. If such a watermarked object is cropped to remove the watermark (e.g., by an attacker), the object would be distorted sufficiently that its quality would be substantially inferior to the original object or the watermarked object. A person skilled in the art will know what portion of the spectrum to modulate for a particular object without undue experimentation.

From the key vector V, a watermark vector W applicable for inserting into a selected portion of the original object I(i,j) is obtained (block 110). As will be described later, the watermark vector W is dependent on the particular portion of the original object I(i,j) selected for the insertion of the watermark. After incorporating the watermark into the original object I(i,j) by combining the watermark vector W with the selected portion of the original object I(i,j), the watermarked object I'(i,j) is obtained (block 112).

To better illustrate the preferred embodiment of the invention, an example of watermarking a visual image is provided below. It is to be understood that other types of physical objects, for example, those mentioned above, e.g., audio digital objects, tactile digital object, and the like, can be similarly watermarked by a person skilled in the art based on the present disclosure.

EXAMPLE

The process is described in general and illustrated in FIG. 3 as follows (1) A digital object image I(i,j) with m rows and n column of pixels is obtained. A message digest of the data bits in I(i,j) is computed, using a standard message algorithm such as the MD5 function, to obtain the message digest M.

(2) The message digest is signed to create the owner's signature, with encryption methods such as the RSA method or Elliptic Curve, thus obtaining the encrypted message digest S.

(3) Let S be the bits of the signature for constructing a watermark. For example, S may have 512 bits. A vector U of n entries is constructed, where n corresponds to the number of columns of pixels. Alternatively, the vector can have m entries corresponding to the number of rows, m. If that is the case, the following steps referring to rows will be applied to columns instead, and vice versa. In constructing U in this example, the second bit to the 65th bits are assigned a modulation value depending on whether the corresponding bits (e.g., the first 64) of the encrypted message digest S are 0 or 1. The rest of the bits in encrypted message digest S are assigned values of 0. The first bit of S is assigned a value of 0 to correspond to the DC component of the pixels. For example, in the second to the 65th bits of U, a bit is assigned a value of −1 for a corresponding bit of 0 in S; the bit in U is assigned a 1 for a corresponding bit of 1 in S. It is to be understood that the modulation can have other optional values, as long as they are consistent and the resulting watermark would not overly distort the object. For example, a bit in U, instead of having a value of −1, may be assigned a value of 2; and a bit of 1 in U, may be assigned a value of −1. Furthermore, the first bits of U may have more bits or less bits than 64. However, a longer U would require more computer power to implement the watermark, and a smaller U is more prone to be broken by an attacker. The first bits of U correspond to the lower frequencies, which are the more conceptually significant frequencies of the visual image object. This is also true for audio digital works. However, it is conceivable that in other works where the perceptually significant bits are in the higher frequencies, the higher frequency bits of U will be modulated. Furthermore, the first bits of U need not be based on the first bits of S, but optionally can be based on some other bits as long as they are consistent. For example, the first bits of U can be based on the last bits, the middle bits, or alternate bits, or the like of S. The first bit in S (corresponding to the DC component) having a value of 0 makes the watermark resistant to changes in brightness or contrast.

(4) A reverse Fourier transform of U is performed to obtain a key vector V. It is to be understood that other types of transforms, e.g., reverse Discrete Cosine Transform (DCT), can be used to transform U from the frequency domain to a physical domain, e.g. time domain (for example, for audio and other time variant signals) or spatial domain (for, example, for images, video, or other spatially varying signals). A person skilled in the art will know how to select and apply such transforms to obtain the key vector V based on the present disclosure to derive a watermark.

(5) A portion of the original object I(i,j) is selected, e.g., b contiguous rows, and this portion is averaged to construct a reference vector A relating to the image pixels for orthogonalization calculation. In this example, the reference vector A is an average vector calculated by averaging data. Depending on the object, one may want to select the whole object, or a portion thereof that has conceptually important details. For example, b can be 16 in the middle section of the image, indicating that 16 rows in the middle section is to be averaged to form A. Then, to reduce the risk that the key vector V would have a dependency on the vector A, i.e., would depend on the columnic position of the elements in the b rows of the object, preferably the key vector V is orthogonalized with respect to the reference vector A, thereby obtain a watermark vector W. The orthogonalization can be represented by the equation:

$$W = V - (\hat{V} \cdot \hat{A}) A \qquad \text{Eq. 1}$$

where $\hat{V} = \dfrac{V}{\sqrt{V \cdot V}}$ and $\hat{A} = \dfrac{A}{\sqrt{A \cdot A}}$ is the unit vector along A. The watermark vector W represents the frequency and magnitude data of the digital watermark that is to be incorporated into the original object I(i,j).

(6) The watermark vector W is incorporated into the original object I(i,j), preferably, by inserting into the portion of the I(i,j) from which the reference vector A has been derived. A common method of inserting the watermark vector W is by adding a small scaled version of W back to each of the b rows selected for the reference vector A earlier.

This method of obtaining the watermarked elements I'(i,j) in the object can be represented by the following equation:

$$I'(i,j) = I(i,j) + a(i,j) W(i,j) \qquad \text{Eq. 2}$$

In Eq. 2 a is a proportional constant, which may vary depending on the positions of i or j if preferred.

In a preferred embodiment, $$a(i,j) = c \cos(2\pi i / b) \qquad \text{Eq. 3.}$$

Typically, c is chosen such that the watermark signal is roughly −40 dB PSNR (peak signal to noise ratio). Other methods of inserting watermarks can also be used. For example, multiple scaling factors that depend on other factors can be used. Additional watermarks can be added to other locations of the digital object as desired, by repeating the orthogonalization and the watermarking steps using the same key vector V. Alternative methods of incorporating watermark using watermark factors are apparent to one skilled in the art based on the present disclosure (see, e.g., Cox, et al. supra, which is incorporated by reference herein). In the example shown in FIG. 3, the b rows of the original digital object are replaced with the b rows of watermarked pixels. Thus the watermarked object I'(i,j) (which has the same number of rows m and the same number of columns, n, as the original object) includes b rows of watermarked elements, whereas the remaining (m-b) rows of elements remain unchanged from the same rows in the original digital object. The resulting watermark is a one-dimensional watermark in that it involves all the columns in the variation of i or j in Eqs. 2 to 3, or other similar equations. This one-dimensional watermark is mathematically simpler than a two dimensional watermark in which the W varies as a function of the rows as well as the columns. However, if desired, a two-dimensional watermark can be created such that a watermark matrix $W_m$ having elements that are derived from the process of one-way hash function and encryption. For example, $W_m$ can be derived from V by incorporating V with various proportional constants into the elements at various columns and rows in $W_m$. This foregoing description is just one example, a skilled person will know how to derive a two-dimensional watermark from the present disclosure.

Figure 4:
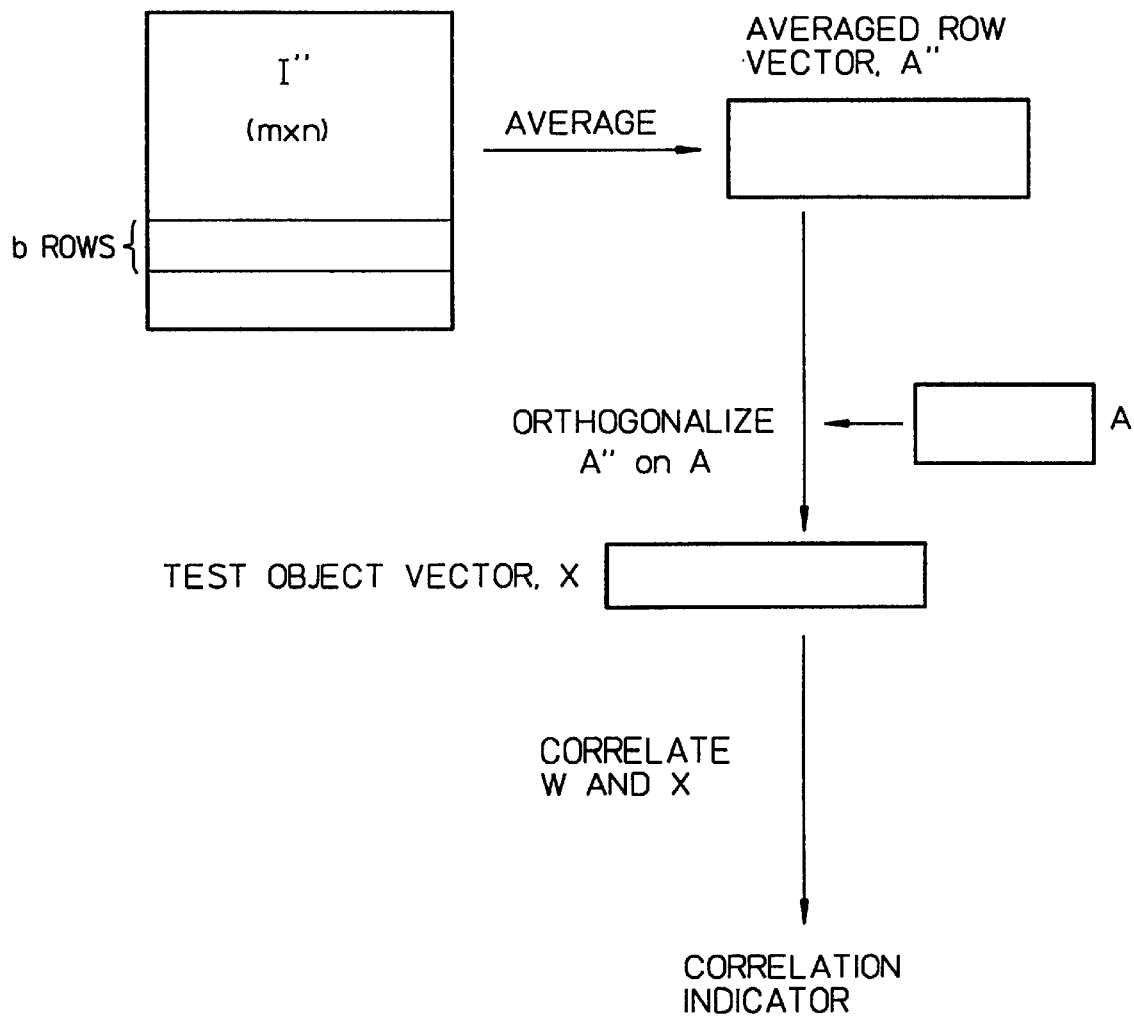
FIG. 4 shows how a suspect object is evaluated to determine whether it is derived from a watermarked object, according to an embodiment technique of the present invention.

Given a suspect image I"(i,j) suspected of being derived (e.g., copied) from the watermarked object I'(i,j), the suspect image can be evaluated by the following method, which is illustrated in FIG. 4. This method requires the watermark vector V and the average row vector A. In this method, each block of b contiguous rows in the suspect image for the watermark is successively evaluated. For example, the first b contiguous rows can be evaluated, then the b contiguous rows starting from the second row to the (1+b)th row, then the third row to the (2+b)th row, and so on.

(A) In each block to be evaluated, the b rows are averaged to obtain a reference vector A".

(B) The vector A" is orthogonalized with respect to A to obtain a suspect watermark vector X. The mathematics of orthogonalizing A" is similar to that of orthogonalizing the key vector V in Eq. 1.

(C) The relative closeness of X to W is computed, e.g., by calculating the correlation between the W and X. The equation for calculating the correlation between X and W a is as follows:

$$Correlation = \frac{W \cdot X}{\sqrt{(W \cdot W)(X \cdot X)}} \qquad Eq.4$$

(D) Step (C) is repeated to compute the relative closeness of X to W for all the blocks of contiguous b rows. The maximum of the relative closeness over all the blocks of b rows is then taken. If this relative closeness is above a predetermined threshold value, then the suspect image is deemed to contain the watermark.

(E) If the suspect image I"(i,j) is cropped or scaled, a horizontal search by searching at various match locations along the reference vector A" can be performed to get the best relative closeness, i.e., to arrive at the maximum correlation of the watermark to the suspect object. Further, a search can be conducted for reflections of the digital object about the axes.

(F) Synthesize a number of random candidate watermark vectors (e.g., one hundred watermarks) with the same spectral properties as V. Compute the correlation of each of these candidate vectors with the suspect digital object I"(i,j), at the location, scale, and crop factors at which the correlation of W was maximized.

(G) Compare the correlation obtained from the original watermark against the correlation obtained for the random vectors. If the former and the latter are far apart, then it is likely that the suspect object I"(i,j) contains the watermark key vector V. In other words, it is likely that suspect object I"(i,j) has the watermark of the original object I(i,j), and therefore is likely to have been derived from it.

The above deals with detecting whether a suspect object is derived from an original object. In the case that the ownership of a digital object J(i,j), e.g., a digital image, is in dispute, the ownership can be established via determining the presence of a watermark by a neutral third party such as a judge. A person claiming ownership of the digital object will present to the judge his original image I(i,j) corresponding to J(i,j) and the signature S of the hash of that original digital object, and his public key for decryption. He would further declare the location in the digital object J(i,j) where the watermark can be found and the scaling and cropping factors of J(i,j) with respect to his original object I(i,j). The judge can verify using the following process.

(A) Compute a message digest of the bits in I(i,j). Decrypt S with the public key presented by the claimant. The bit strings for the message digest computed and the decrypted S should be the same if the claimant is the owner of J(i,j). Otherwise, reject the claimant's claim of ownership.

(B) Construct the watermark vector V from the signature S. At the specified location of the object J(i,j) compute the correlation of the watermark vector V after compensating for cropping and scaling. Use the original object I(i,j) to compute the corresponding reference vector A.

(C) Synthesize random candidate watermarks with the same spectral properties of V. Compute the correlation of each of these candidate vectors with the object J(i,j) and compare the correlation obtained with V to the correlation obtained with the random candidate vectors as in the aforementioned method for dectecting the presence of a watermark in a suspect digital object. If the two correlation types are far apart, then it is likely that the object J(i,j) contains the watermark vector V, i.e., contains the watermark of the object I(i,j) provided by the claimant.

Figure 5:
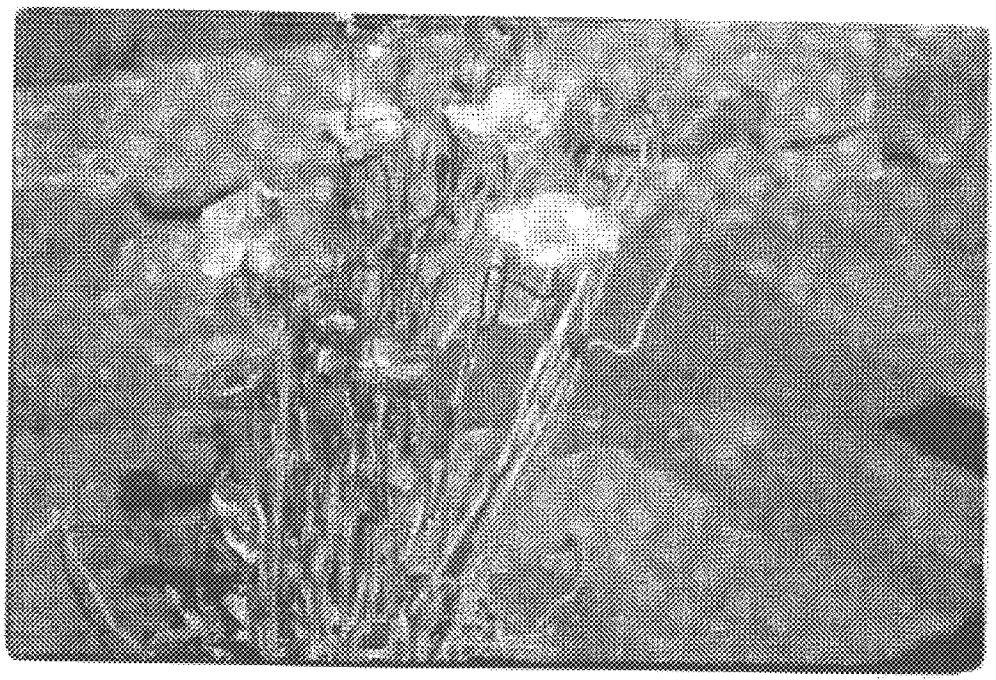
FIG. 5 shows a picture printed from a digital image.
Figure 6:
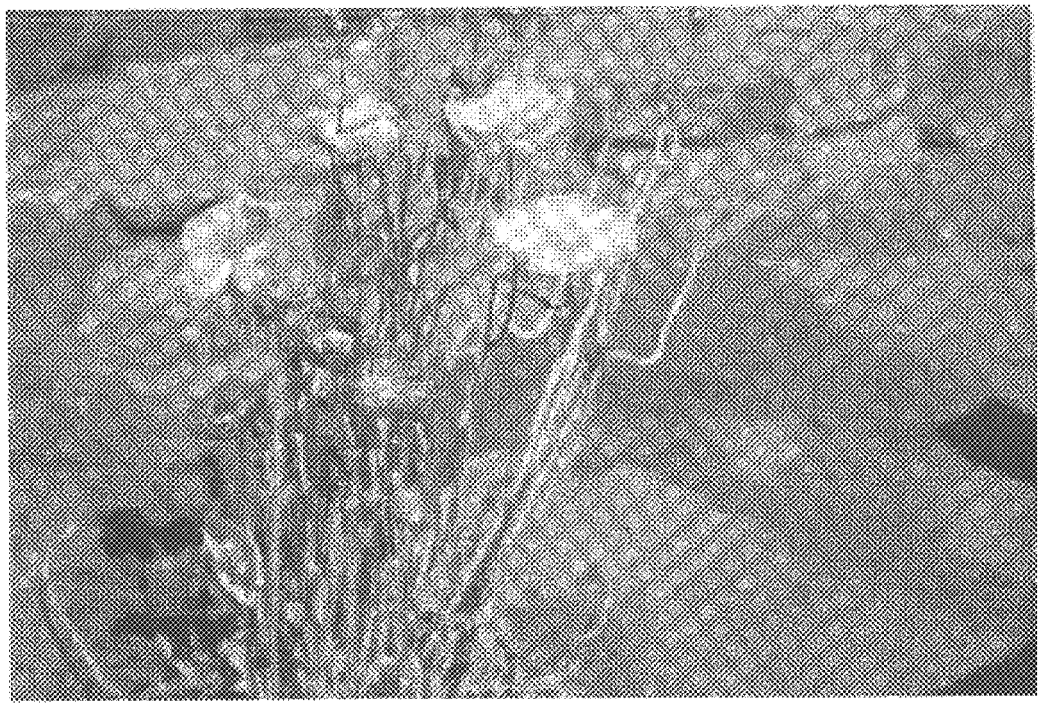
FIG. 6 shows a picture printed from a digital image having a watermark incorporated into the digital image of FIG. 5.
Figure 7:
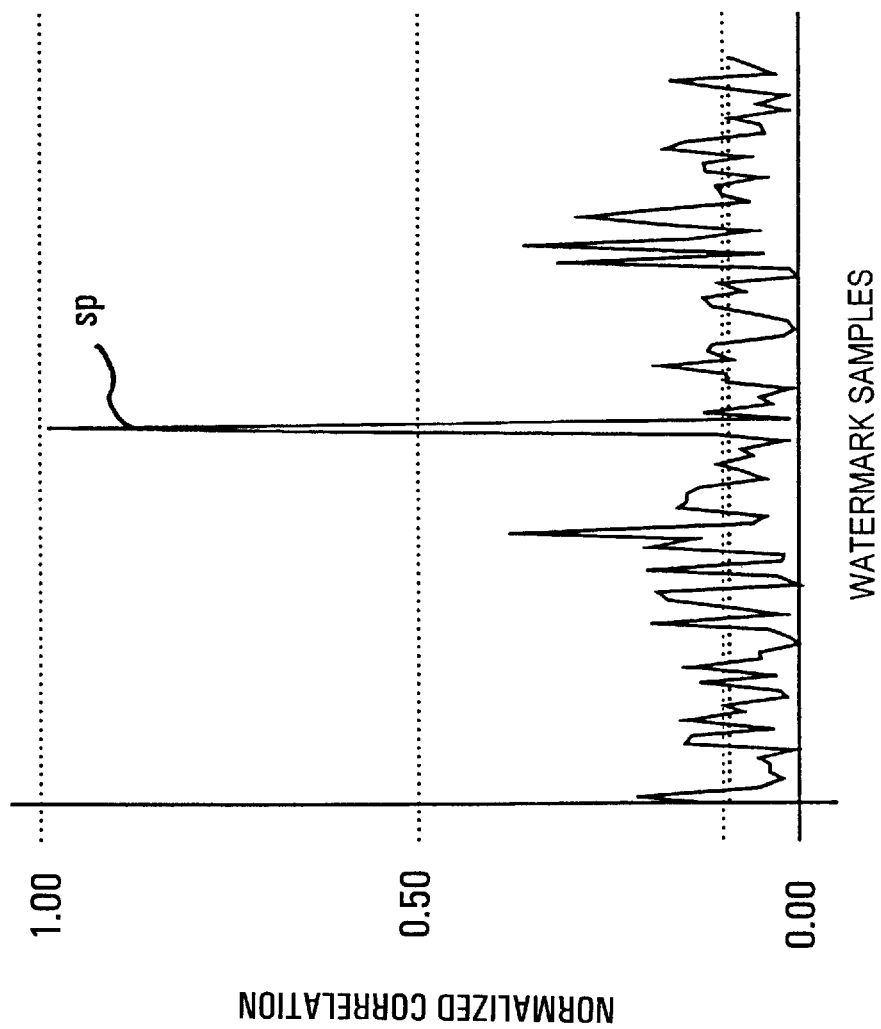
FIG. 7 shows a correlation spread of FIG. 6.

In this example a digital image was evaluated. The original image object used in this illustrative example is shown in the picture of FIG. 5. The original image object has 256 (m rows)×384 (n columns) of pixels. The watermarked image is shown in FIG. 6. The strength of the watermark is −45DBPSNR. A comparison of FIG. 5 and FIG. 6 shows that there is no perceptual difference that is distinguishable to the human eye. What can be distinguished by the human sense organs, e.g., the eye, has been known in the art or can be determined without undue experimentation. FIG. 7 shows the correlation spread obtained by a verification algorithm for the watermarked image of FIG. 6 using the above correlation method. In FIG. 7, the abscissa shows the various spurious watermarks with the same spectral properties as the true watermark embedded in the image. The spurious watermarks were synthesized by the verification algorithm. The spike "sp" in the middle of the figure corresponds to the correlation when applied to the image with the true watermark, whereas the rest of the graph shows the correlation when applied to randomly generated watermarks and the true watermark of the same spectral bandwidth.

Figure 8:
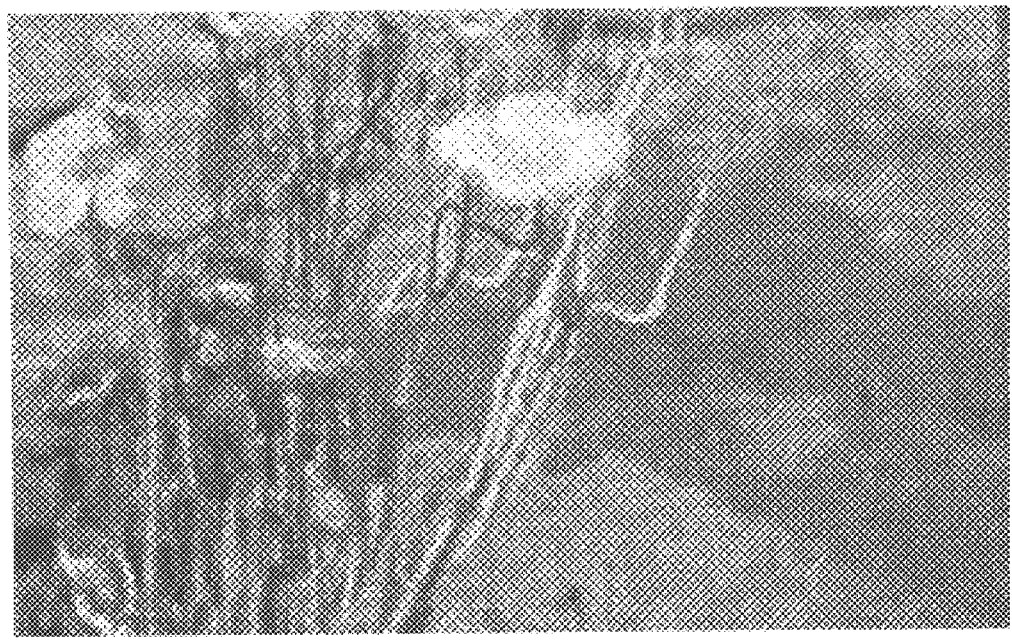
FIG. 8 shows a cropped and JPEG-compressed watermarked image of FIG. 5, showing the resistance to distortion by compression and cropping.
Figure 9:
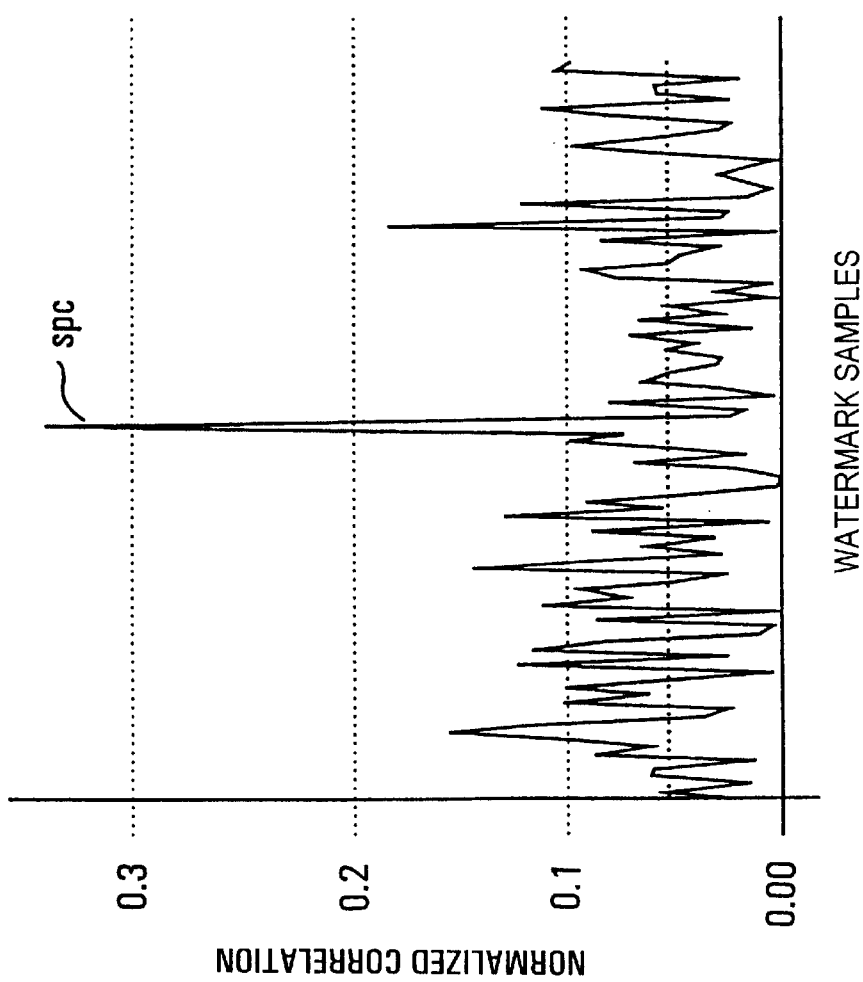
FIG. 9 shows a correlation spread of FIG. 8, showing the sensitivity of the evaluation for the presence of watermark in the object even when the object has been cropped and compressed.
Figure 10:
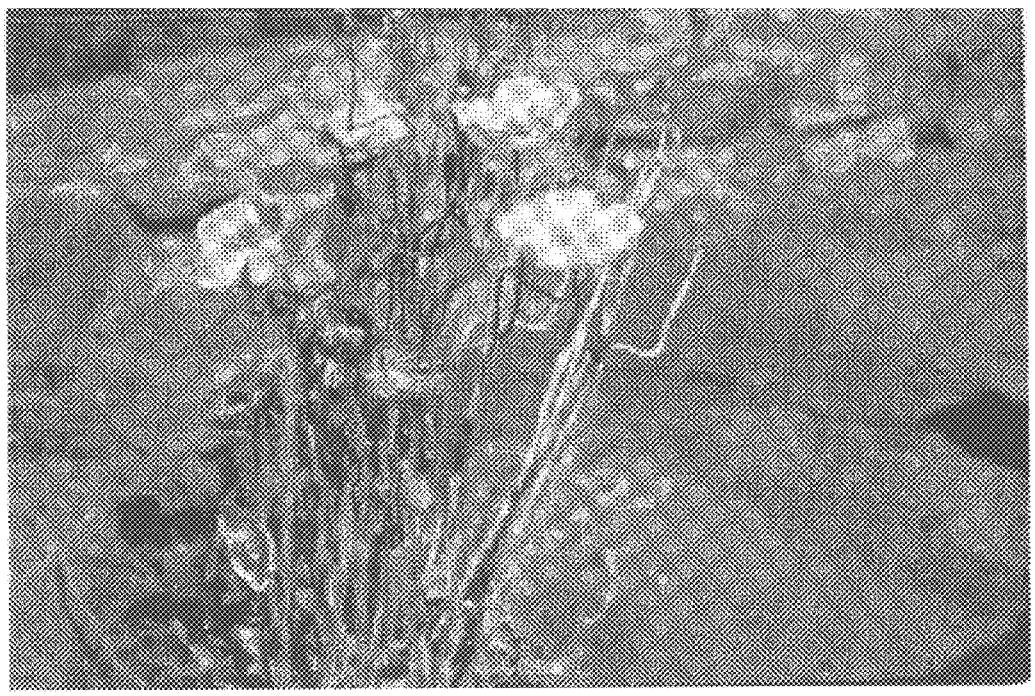
FIG. 10 shows a truncated watermarked image of FIG. 5, showing the resistance to distortion by truncation.
Figure 11:
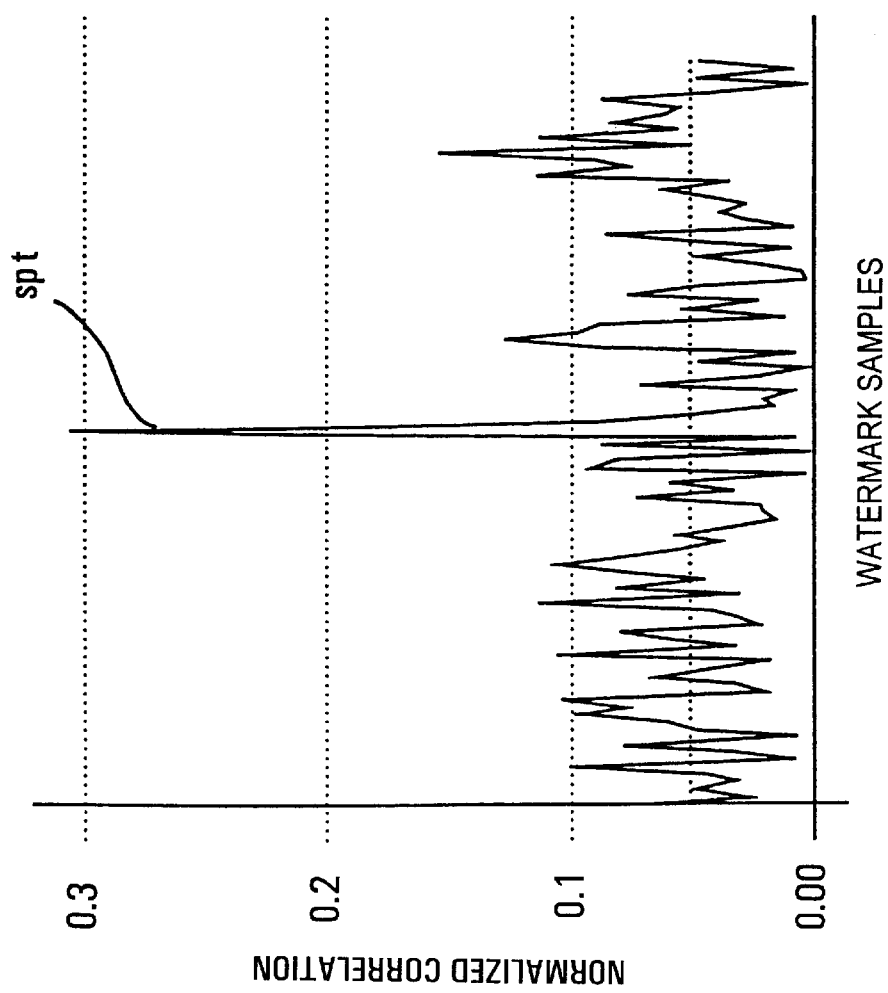
FIG. 11 shows a correlation spread of FIG. 10, showing the sensitivity of the evaluation for the presence of watermark in the object even when the object has been truncated.

To evaluate the robustness of the watermark in its resistance to distortion by cropping and compression, the digital object of FIG. 5 was cropped to 176×274 pixels and JPEG compressed with substantial loss, achieving a compression ration of 28.6 (JPEG is a standard lossy compression method, see Bhaskaran and Konstantinides, *Image and Video compression standards,* Kluwer Publishers). The cropped, compressed image was decompressed to result in the image of FIG. 8. FIG. 9 shows the correlation spread for the image of FIG. 8. A tall spike "spc" is clearly seen in the middle of the spread, indicating the presence of the watermark, thus identifying that the picture of FIG. 9 as being derived from the image of FIG. 5. Similarly, making a downscaled version of the image of FIG. 5 and computing the correlation spread of the downscaled image (not shown in the figures) indicate that the watermarking was verifiable after downscaling, thus showing that the watermark is resistant to scaling. Further, FIG. 10 shows the picture of the image of FIG. 5 after truncation with setting to zero the five least significant bits of each eight-bit pixel in the watermarked image of FIG. 6. FIG. 11 shows the correlation spread obtained by processing through the detection procedure for the image of FIG. 10. Again, a clear spike "spt" is seen in the correlation spread. Thus, this evaluation on truncation shows that the watermark is resistant to truncation.

The technique of watermarking a digital object and evaluating a suspect digital object for the presence of the watermark according to the present invention can be implemented with digital electronics that are capable of data manipulation and calculation based on the equations described herein above. Such applicable digital electronics include microprocessors and computers, e.g., personal computers, minicomputers, and mainframe computers. Furthermore, the algorithms for the data manipulation and calculation can be stored in digital storage devices, such as compact discs, floppy discs, hard discs, magnetic tapes, and the like, which can then be loaded or read into the microprocessors or computers for implementation of the watermarking and calculation processes. Such digital storage devices are generally articles of manufacture having a suitable digital storage medium readable by the microprocessors or computers. It is also contemplated that various computers can be networked so that digital objects can be transferred between computers to be watermarked and evaluated for watermarks. It is also to be understood that the various steps in the watermarking process described above can be done separately by different computers and processors and the results be combined to achieve the overall function of watermarking or evaluation for the presence of watermark, as well as both.

Although the preferred embodiment of the present invention has been described and illustrated in detail, it is to be understood that a person skilled in the art can make modifications within the scope of the invention.

What is claimed is:

1. A system for identifying a digital object using a digital watermark, comprising:
    means for obtaining a set of source data from the digital object, the source data comprising a set of data values;
    means for generating a message digest by applying a function to the source data which is preselected to avoid reconstruction of the source data from the message digest;
    means for encrypting the message digest to obtain an encrypted message digest;
    means for deriving a watermark vector from the encrypted message digest;
    means for determining an average vector of a selected subset of the data values;
    means for avoiding a dependency between the watermark vector and the average vector by orthogonalizing the watermark vector with respect to the average vector;
    means for combining the watermark vector with the selected subset of the data values of the source data to obtain a watermarked object that includes the digital watermark.

2. The system of claim 1, wherein the function is preselected such that the message digest contains fewer bits than the source data.

3. The system of claim 1, wherein the means for deriving a watermark vector includes means for modulating the encrypted message digest to spread over a portion of a spectrum of the digital object.

4. The system of claim 1, wherein the means for encrypting the message digest comprises means for encrypting the message digest using a public key system.

5. An article of manufacture comprising a program storage medium, tangibly embodying a program code means readable by a computer to cause the computer to identify a digital object using a digital watermark, comprising:
    code means for obtaining a set of source data from the digital object, the source data comprising a set of data values;
    code means for generating a message digest by applying a function to the source data which is preselected to avoid reconstruction of the source data from the message digest;
    code means for encrypting the message digest to obtain an encrypted message digest;
    code means for deriving a watermark vector from the encrypted message digest;
    code means for determining an average vector of a selected subset of the data values;
    code means for avoiding a dependency between the watermark vector and the average vector by orthogonalizing the watermark vector with respect to the average vector;
    code means for combining the watermark vector with the selected subset of the data values of the source data to obtain a watermarked object that includes the digital watermark.

6. The article of manufacture of claim 5, wherein the function is preselected such that the message digest contains fewer bits than the source data.

7. The article of manufacture of claim 5, wherein the code means for deriving a watermark vector includes code means for modulating the encrypted message digest to spread over a portion of a spectrum of the digital object.

8. The article of manufacture of claim 5, wherein the code means for encrypting the message digest comprises code means for encrypting the message digest using a public key system.

9. A method for identifying a digital object, comprising the steps of
    deriving a watermark vector from the digital object;
    determining an average vector of a selected subset of the digital object;
    avoiding a dependency between the watermark vector and the average vector by orthogonalizing the watermark vector with respect to the average vector;
    combining the watermark vector and the digital object.

10. The method of claim 9, wherein the step of deriving a watermark comprises the steps of:
    generating a message digest by applying a function to the digital object which is preselected to avoid reconstruction of the digital object from the message digest;
    encrypting the message digest to obtain an encrypted message digest;
    deriving the watermark vector from the encrypted message digest.

11. The method of claim 9, further comprising the step of determining an average vector of a selected portion of the digital object.

12. The method of claim 11, A wherein the step of orthogonalizing comprises the step of orthogonalizing the watermark vector with respect to the average vector.

13. A method for identifying a digital object, comprising the steps of:
    deriving a watermark vector from the digital object;
    determining an average vector of a selected portion of the digital object;
    avoiding a dependency between the watermark vector and the digital object by orthogonalizing the watermark vector with respect to the average vector;
    combining the watermark vector with the digital object.

14. The method of claim 13, wherein the step of deriving a watermark comprises the steps of:
    generating a message digest by applying a function to the digital object which is preselected to avoid reconstruction of the digital object from the message digest;
    encrypting the message digest to obtain an encrypted message digest;
    deriving the watermark vector from the encrypted message digest.

* * * * *